United States Patent Office 3,700,615
Patented Oct. 24, 1972

3,700,615
WASTE RUBBER DISPOSAL
Charles E. Scott, Yardley, Pa., assignor to Cities
Service Company, New York, N.Y.
No Drawing. Filed Dec. 11, 1970, Ser. No. 97,359
Int. Cl. C08d 13/38
U.S. Cl. 260—2.3                                     1 Claim

ABSTRACT OF THE DISCLOSURE

Waste vulcanized rubber is depolymerized in a liquid hydrocarbon medium by means of agitation, heat, free-radical initiators, and molecular oxygen. The resulting solution of rubber-modified hydrocarbon can then be utilized in the manufacture of end-use products, thereby disposing of the waste rubber without pollution of the ecological environment. The rubber-modified hydrocarbon can, for instance, be vulcanized to produce a moisture barrier or insulation coating. It can also be mixed with asphalt to provide rubberized asphaltic compositions. In still another application, the rubber-modified hydrocarbon can be thermally decomposed to produce carbon black.

BACKGROUND OF THE INVENTION

This invention pertains to the disposal of waste or scrap rubber and more particularly pertains to a method for disposing of waste vulcanized rubber such as worn-out vehicle tires, inner tubes, rubber hoses, belts, and the like.

Careless diposal of waste rubber has resulted in considerable pollution of the ecological environment. In the United States alone, something like 250,000,000 worn-out automobile tires must be disposed of each year. This figure will increase in the future and does not include the large number of other types of vulcanized rubber articles which must also be disposed of.

Only about 20 percent of the national rubber consumption is in the form of reclaimed rubber, so that about 80 percent of all waste vulcanized rubber must be burned, buried, or sunk at sea. Unfortunately, a large portion of this waste is now burned in the open air, an indiscriminate practice which liberates huge quantities of soot and other pollutants into the atmosphere. A serious need has thus arisen for reutilization of waste vulcanized rubber, in much larger quantities than heretofore, whereby this source of pollution is largely reduced or eliminated.

In the U.S. patent application, Ser. No. 884,037, filed Dec. 10, 1969, and assigned to the same assignee as this application, a process is disclosed for disposing of waste rubber by digesting it in a carbon black feedstock oil, and whereby the resulting rubber-modified oil is thermally decomposed into utilizable carbon black by otherwise conventional means. For instance, the rubber-modified feedstock oil is sprayed into hot combustion gases in a carbon black furnace and is thus transformed into carbon black which is then separated from the gases and recovered as a useful product, e.g. as a reinforcing filler for rubber.

While the aforementioned process is fully operable and utilizable for its intended purpose, difficulty has nonetheless been encountered when digesting vulcanized rubber in a liquid hydrocarbon medium. For instance, the viscosity and digestion time have a tendency to become prohibitive as the concentration of rubber in the liquid feedstock oil is increased. In addition, rather high temperatures have been required for achieving satisfactory digestion of the rubber in the oil, e.g. about 550° F. to about 700° F. Another drawback has been that the resulting rubber-modified oils have been nonhomogeneous because dissolution of the rubber and dispersion of insolubles contained therein has been substantially incomplete.

SUMMARY OF THE INVENTION

It is therefore an object of the present invention to increase the rate at which waste vulcanized rubber can be disposed of while avoiding pollution of the ecological environment.

Another object of the present invention is to convert waste vulcanized rubber into carbon black which can be usefully incorporated into rubber, ink or paint vehicles, and the like.

Even another object of the present invention is to produce a vulcanizable, rubber-modified liquid hydrocarbon from a rubber which has already been vulcanized.

Still another object of the present invention is to produce a rubberized asphaltic composition which comprises a devulcanized rubber.

Yet another object of the present invention is to provide a rubber-modified liquid hydrocarbon having a relatively low viscosity.

A further object of the present invention is to provide a method for dissolving vulcanized rubber in a liquid hydrocarbon medium at relatively low temperatures.

Another object of the present invention is to provide a rubber-modified hydrocarbon which is homogeneous to the extent that the rubber is thoroughly dissolved in the hydrocarbon while insoluble components of the rubber are uniformly dispersed therein.

Other objects and advantages of the present invention will become apparent from the following description and the appended claims.

In the present invention, vulcanized rubber is incorporated into a hydrocarbon medium by mixing the rubber with the hydrocarbon, while the latter is in liquid form, and by agitating the resulting mixture under heat and in the presence of a free-radical initiator and molecular oxygen until devulcanization and dissolution of the rubber in the liquid hydrocarbon is substantially completed. The resulting rubber-modified hydrocarbon solution is characterized by a viscosity which is substantially lower than when the rubber is digested in the same hydrocarbon in the absence of a free-radical initiator and molecular oxygen.

By means of the present process, the polymeric chains of the vulcanized rubber are efficiently scissioned, thereby depolymerizing the rubber. The viscosity of the mixture will first increase and then will decrease to a desirable level after all of the rubber is solubilized as a function of continued depolymerization.

The liquid hydrocarbon in which the rubber is dissolved can be of almost any type, but aromatic hydrocarbons are preferred and carbon black feedstock hydrocarbons can be employed to particular advantage. Typical carbon black feedstock oils have a BMCI within the range of about 90 to about 160, and more commonly within the range of about 115 to about 135.

Scissioning and dissolution of the rubber can be carried out at any practical temperature, but can be advantageously accomplished within the range of about 50° C. to about 200° C. (about 122° F. to about 392° F.).

Molecular oxygen, which serves as one of the depolymerizing agents, can be supplied to the rubber-modified hydrocarbon mixture in any suitable manner while exercising precautions against violet overreactions such as result, for example, by the combination of pure oxygen and hydrocarbon oils. Air can be used to advantage, e.g. a stream of air can be introduced into the rubber-modified hydrocarbon mixture during the agitation and heating thereof. Oxygen which has been diluted with nitrogen or other inert gases, in order to provide a controlled reaction with the mixture, can also be employed.

The term "free-radical initiator" as used herein includes compounds which liberate free radicals upon heating or which result in the formation of free radicals by the action of molecular oxygen thereon. Examples of compounds which liberate free radicals when heated include peroxides, hydroperoxides, persulfates, and azo compounds. Examples of initiators which generate free radicals by the action of molecular oxygen thereon include organically soluble salts of a transition metal.

The rubber-modified hydrocarbon solution which is produced in accordance with the present invention can be utilized in any desired manner. It can, for instance, be vulcanized to provide a moisture barrier in the form of coatings, strips or sheets. It can also be mixed with an asphalt to provide rubberized asphaltic compositions which can be employed as a paving material, surface coating, or the like. In addition, the rubber-modified hydrocarbons of this invention can be thermally decomposed to produce carbon black which is recovered and used in the compounding of rubber, paints, inks, and the like.

DETAILED DESCRIPTION OF THE INVENTION

Dissolution of dissolved rubber in accordance with the present invention is not limited to a particular type of rubber since it can be practiced with natural and/or synthetic varieties. Furthermore, the particles of rubber being dissolved need not be of a particular size, although the smaller the better, since deploymerization and dissolution of the rubber is thereby enhanced.

Methods of grinding waste rubber are well known in the reclaiming art, e.g. the rubber may be ground by means of "cracker" rolls or a "hog." A satisfactory particle size of about $\frac{1}{16}$ to about $\frac{3}{8}$ of an inch is obtained by sifting and by repeated passage of the rubber through the grinder if necessary. Cord, or fabric, which may be contained by the vulcanized rubber, can be removed to a large extent by blowing the ground up particles with air. Any cord or fabric which is not separated by the air blowing operation can remain with the rubber during the dissolution thereof and can subsequently be removed from the resulting solution by straining or filtering if necessary. In some cases the chopped cord or fabric can, to advantage, be retained in the solution after dissolution of the rubber, e.g. when the solution is mixed with asphalt, for in such a case the presence of the fibers helps to thicken the mix and improves the consistency thereof. However, when the solution is employed as a carbon black feedstock oil the fibers should be removed before the oil is sprayed into a furnace if they have not been substantially dissolved or digested and dispersed within the oil. When old-tire rubber is to be dissolved, the steel beads can be removed from the tires, prior to dissolution, by known techniques, e.g. it can be cut out before grinding of the rubber, or, in the case of "cracker" rolls, removed afterwards.

Since the present invention pertains to depolymerization and dissolution of vulcanized rubber, it will be appreciated that some of the components therein cannot always be rendered soluble in the hydrocarbon solvent. Reinforcing or non-reinforcing fillers such as carbon black, silica, calcium carbonate, or titanium dioxide are not soluble in a hydrocarbon medium and the rubber may also contain small amounts of zinc oxide or sulfur which are not chemically bound with the polymer, and as such are also insoluble. These insoluble components do not, however, present any problem since they become discretely dispersed in the rubber solution during its formation and can be retained therein as an integral component of the rubber solution.

As previously indicated, the liquid hydrocarbon medium into which the rubber is incorporated can be any hydrocarbon in which the depolymerized rubber is soluble. The hydrocarbon medium can, therefore, be either paraffinic, aromatic, or halogenated hydrocarbon variety, e.g. petroleum spirits, hexane, kerosene, benzene, toluene, chloroform, carbon tetrochloride, trichloroethylene, a rubber extender oil, a fuel oil, or the like. Aromatic hydrocarbons can be employed to advantage since they seem somewhat more effective in the depolymerization and dissolving process, and it has been determined that highly aromatic oils are particularly effective for the purpose. Therefore, carbon black feedstock oils, the nature of which is well known to those skilled in the art, can be effectively employed and are particularly desirable when the intention is to convert the rubber to carbon black. Generally, carbon black feedstock oils are a petroleum residue or coal tar oil having a mean molecular weight in excess of about 100 and an aromaticity of at least about 50%. Preferably, the molecular weight will range from about 200 to about 350 and the aromaticity will be within the range of from about 70% to about 95%. Accordingly, the BMCI of these oils will range from about 90 to about 160 and more preferably will be within the range of about 115 to about 135. Being a mixture of distillable fractions having different boiling points, they are characterized by a mean boiling point within the range of about 50%. Preferably, the molecular weight will range point within the range of about 450° F. to about 625° F.

It will be understood that the ultimate choice of the type of hydrocarbon in which the rubber is depolymerized and dissolved will to a large extent depend upon the manner in which the rubber-modified hydrocarbon solution is to be utilized. If, for instance, the solution is to be used as a rubber cement, volatile solvents are preferable. When it is to be applied as a weather sealant or insulation coating, a volatile solvent may also be employed along with a vulcanizing agent which is incapable of effective vulcanization in the presence of the solvent at room temperature but which will effect gradual vulcanization of the rubber upon evaporization of the solvent. One such vulcanizing agent is para-dinitrosobenzene. If the dissolved rubber solution is to be used as a cutback for asphalt, the hydrocarbon solvent can, for instance, be a furnace oil, kerosene, or naptha, depending on whether a slow, medium, or rapid cure is desired. When it is desirable to convert the dissolved rubber to carbon black, a carbon black feedstock oil can be employed as the depolymerization and dissolution medium. These same feedstock oils can be also used to produce solutions which can be vulcanized, or which can be combined with asphalt. When a carbon black feedstock oil is employed as the depolymerization and dissolution medium for the rubber, little or no vaporization of the oil occurs during make-up, application, or use of the rubber solution produced in accordance with the invention.

As previously stated, scissioning and dissolution of the rubber in the liquid hydrocarbon medium can be carried out at any practical temperature, i.e. one at which free radicals are liberated at a satisfactory rate by the free-radical initiator, and also at which dissolution of the depolymerized rubber in the hydrocarbon medium is promoted, but not so high as to result in coking or charring of the reaction components, e.g. in excess of about 370° C. Most surprisingly, temperatures within the range of about 50° C. to about 200° C. can be employed to advantage and when the hydrocarbon medium is a carbon black feedstock oil, reaction temperatures within the range of about 100° C. to about 150° C. are practical.

If the free-radical initiator is one which liberates free radicals upon heating, such as a peroxide for instance, it should remain active until depolymerization of the rubber is completed. The length of time to complete the depolymerization will depend, among other things, upon the temperature and the amount of agitation employed in the process, but can in any case be determined by means of a few simple experiments. Suitable heat activated free-radical initiators can be selected from the group consisting of peroxides, hydroperoxides, persulfates, and azo compounds, and which have been employed heretofore as crosslinking agents for monomers rather than for depolymerization. Where preferred the free-radical initiator can be of the type which produces free radicals by the action of molecular oxygen thereon, e.g. an organically soluble salt of a transition metal. Cobalt salts are preferred but organically soluble salts of other transition metals such as manganese ethyl hexanoate can be used. Cobalt napthenate, for example, can be employed as the free-radical initiator. The exact amount of free-radical initiator which should be incorporated into the reaction mixture can be determined by experiment since it is subject to variation and depends, among other things, upon the type of initiator selected and the type of rubber being dissolved.

Molecular oxygen can be supplied to the reaction mixture by any suitable means. For instance, air, or an equivalent thereof, can be continuously or intermittently introduced into the mixture during depolymerization of the rubber. The amount of molecular oxygen which should be included in the reaction mixture is critical only to the extent that a sufficient amount of oxygen need be available for entry into the depolymerization reaction and substantially enhance the same. The proper amount of molecular oxygen can thus be furnished by maintaining the action mixture saturated with air during the depolymerization process. Since air is satisfactory for the purpose, the use of undiluted oxygen or other strong oxidants can be avoided, for as previously stated, care should be exercised in choosing an oxidizing agent, with a view towards preventing violently exothermic reactions with the hydrocarbons of the reaction mixture.

When a carbon black feedstock oil is employed as the depolymerization and dissolving medium in the practice of this invention, it has been determined that from about 10 to about 50 weight percent of vulcanized rubber can be incorporated therein to provide a solution of the depolymerized rubber which also contains the insoluble components in a dispersed state. Since the resulting rubber-modified feedstock oil is very homogeneous in nature and can be produced having a sufficiently low viscosity, e.g. 300 cps. at 100° C., it can be used to particular advantage as a carbon black feedstock in a furnace black process. Accordingly, a fluid fuel such as natural gas is burned with a free oxygen-containing gas such as air to form hot combustion gases which are contained within the furnace. The rubber-modified feedstock oil is then sprayed into the furnace and dispersed within the hot combustion gases contained therein. The hydrocarbon constituents of the feedstock, e.g. the oil and the rubber, are thermally decomposed by absorption of heat from the combustion gases, thus producing an aerosol of carbon black suspended in gases produced by combustion of the fuel and by the thermal decomposition of the hydrocarbons. The carbon black aerosol is then passed into conventional equipment for separation and recovery of the carbon black from the gases. Insoluble and relatively incombustible components of the modified feedstock, e.g. carbon black and metal oxide pigments, become blended with the newly produced carbon black and are recovered therewith, thus becoming part of the useful product which results from disposal of waste rubber in this fashion.

It will be understood that the terms "depolymerize," "depolymerizing" or "depolymerization" as used herein with reference to devulcanization are not intended to mean that the rubber is in each case completely depolymerized into the one or more monomers from which it was produced. These terms are instead intended to mean that scissioning of the polymer chains takes place to such an extent that the rubber is rendered fully soluble in the hydrocarbon medium or else is rendered substantially more soluble than before.

Example I

Worn-out automobile tires were ground up to provide particles of vulcanized rubber. 20 pounds of this ground rubber was suspended in 180 pounds of a carbon black feedstock oil having the properties shown in Table I. The mixture was contained in a 50 gallon vessel equipped with a stirrer and a refluxing condenser. The mixture was stirred and heated at 130° C. for 24 hours. At the end of this period a small sample was removed from the vessel and was drawn down a glass slide. Examination of the drawdown revealed many swollen particles, i.e. the rubber was not thoroughly dissolved and the mixture was not homogeneous. Using a Brookfield Viscosimeter, the viscosity of the mixture was measured at 100° C., and was found to be 900 centipoise at 10 r.p.m., 560 centipoise at 50 r.p.m., and 430 centipoise at 100 r.p.m.

It will be appreciated that no free-radical initiator or molecular oxygen were employed during digestion of the rubber in accordance with this experiment.

TABLE I

Carbon black feedstock oil (unmodified)

| | |
|---|---|
| API gravity | 0.2 |
| Viscosity: | |
| SSU @130° F. | 594.0 |
| SSU @210° F. | 67.0 |
| Molecular weight | 295.0 |
| BMCl | 123.0 |
| Index of refraction | 1.648 |
| Weight percent sulfur | 1.060 |
| Weight percent ash | 0.003 |
| Weight percent benzene insolubles | 0.039 |
| Weight percent asphaltenes | 0.500 |
| UOP K Factor | 10.0 |
| Mean boiling point, ° F. | 790.0 |
| Specific gravity | 1.0744 |
| Pounds per gallon | 8.949 |

Example II

The experiment of Example I was repeated but with the addition of 0.37 pounds of cobalt naphthenate to the suspension of rubber. In addition, a stream of air was continuously bubbled through the mixture during the reaction; and, as before, the mixture was stirred and heated at 1300 C. for 24 hours. At the end of that period, drawdown examination indicated the absence of undissolved rubber and the mixture otherwise appeared very homogeneous. The viscosity of this rubber-modified feedstock, which had been produced in accordance with the invention, was measured at 100° C. and found to be 300 centipoise at 10 r.p.m., 300 centipoise at 50 r.p.m., and 240 centipoise at 100 r.p.m.

It is therefore fully apparent that modification of a hydrocarbon in accordance with the present invention provided a rubber-modified carbon black feedstock characterized by a homogeneous nature and a much lower viscosity. It will also be appreciated that the invention was carried out while using much lower temperatures than heretofore thought possible. Previously, temperatures on the order of about 180° C. to about 320° C. were considered necessary for a satisfactory digestion of rubber in a carbon black feedstock oil.

Example III

Approximately 300 gallons of a rubber-modified carbon black feedstock oil was produced in accordance with Example II. Using a conventional oil furnace process for the manufacture of tread grades of carbon black, the rubber-modified feedstock oil was sprayed into the furnace at the rate of 59 gallons (60° F.) per hour and was thermally decomposed therein to produce an ISAF grade of carbon black. Operational procedures during this experiment were substantially the same as when producing carbon black from the same feedstock in unmodified form. The carbon black was recovered, and testing indicated that it could be successfully employed as a reinforcing filler in automobile tire treads.

Example IV 90 pounds of California asphalt was thoroughly mixed at 150° C. with 10 pounds of the rubber-modified feedstock oil of Example II to provide an asphaltic composition suitable for use in the paving of roads.

The relatively low viscosity of the rubber-modified feedstock oil greatly facilitated the blending thereof with asphalt. Ordinary ground rubber, raw or vulcanized, is quite difficult to disperse and dissolve in asphalt under practical conditions of time, temperature and agitation. The addition of the rubber-modified feedstock oil to the asphalt brought about the anticipated improvements in performance, i.e. reduced temperature sensitivity and improved tenacity and toughness.

Example V 45 pounds of petroleum asphalt and 10 pounds of slate dust were mixed with 5 pounds of the rubber-modified feedstock oil of Example II to provide an asphaltic composition suitable for use as a roofing asphalt.

Example VI

Using the same apparatus as in Example I, ground-up tire rubber was dissolved in the same feedstock oil using cobalt acetate as the free-radical initiator. Proportions, conditions, and results are shown in Table II.

TABLE II

|  | Experiment | | | |
| --- | --- | --- | --- | --- |
|  | A | B | C | D |
| Cobalt acetate, pounds | 0.3 | 0.3 | 0.1 | 0.3 |
| Scrap tire rubber, pounds | 50.0 | 40.0 | 40.0 | 40.0 |
| Feedstock oil, pounds | 150.0 | 160.0 | 160.0 | 160.0 |
| Air to mixture | Yes | No | Yes | Yes |
| Reaction time, hours | 6.5 | 6.5 | 6.5 | 6.5 |
| Reaction temperature, ° C. | 150.0 | 150.0 | 150.0 | 150.0 |
| Brookfield viscosity, cps. @ 110° C.: | | | | |
| 10 r.p.m. | 1,150 |  | 900 | 550 |
| 50 r.p.m. | 1,190 |  | 950 | 650 |
| 100 r.p.m. | 1,140 |  | 925 | 640 |
| Remarks: A and C | (¹) |  | (¹) |  |
| Remarks: B and D |  | (²) |  | (²) |

¹ Homogeneous.
² Heterogeneous.

In Experiment A, 25% by weight of old-tire rubber was successfully dissolved in the feedstock oil. No air was bubbled through the reaction mixture during Experiment B and it was considered to be a failure since the resulting solution was nonhomogeneous. 20 weight percent of old-tire rubber was dissolved in the feedstock oil in Experiments C and D. These were both successful and it will be noted that lower solution viscosity resulted from the use of 0.3 pound of cobalt acetate in Experiment D as opposed to 0.1 pound employed in Experiment C.

Example VII 100 grams of the rubber-modified feedstock solution of Experiment A, Example VI was thoroughly mixed with 1.5 grams of sulfur, 4.0 grams of zinc oxide and 1.5 grams of N-oxydiethylene benzothiazole-2-sulfenamide, the latter being a vulcanization accelerator. The mixture was then heated at 150° C. for 60 minutes to provide a solidified mass wherein the depolymerized rubber was revulcanized. The mixture was molded as a strip to provide a vulcanized sealant strip suitable for use in architectural weather sealing applications.

While the invention has been described with reference to specific materials, conditions, procedures, uses and the like, it will be understood that other embodiments will become apparent which are within the spirit and scope of the invention as is defined in the appended claim.

Therefore, what is claimed is:

1. Method of incorporating waste vulcanized rubber into a hydrocarbon medium to produce a rubber-modified hydrocarbon solution which comprises mixing said rubber with a liquid hydrocarbon characterized by a molecular weight within the range of about 200 to about 350, an aromatic content within the range of about 70% to about 95%, a BMCI within the range of about 90 to about 160, an initial boiling point within the range of about 550° F. to about 800° F., agitating the resulting mixture under heat and in the presence of a molecular oxygen-containing gas and a free-radical initiator selected from cobalt napthenate and cobalt acetate until devulcanization and dissolution of said rubber in said hydrocarbon is substantially completed, and recovering a rubber-modified hydrocarbon solution having a depolymerized rubber content of about 10 to about 50 weight percent and a viscosity not in excess of about 300 centipoise when measured at 100° C.

References Cited
UNITED STATES PATENTS

| | | | |
| --- | --- | --- | --- |
| 2,558,764 | 7/1951 | Lewis | 260—2.3 |
| 3,008,906 | 11/1961 | Nicolaisen | 260—2.3 |
| 3,042,634 | 7/1962 | Mankowich | 260—2.3 |
| 3,300,417 | 1/1967 | McElroy | 260—2.3 |
| 3,318,838 | 5/1967 | Beverly | 260—2.3 |
| 3,477,968 | 11/1969 | Massoubre | 260—2.3 |
| 3,563,922 | 2/1971 | Massoubre | 260—2.3 |

MORRIS LIEBMAN, Primary Examiner

P. R. MICHL, Assistant Examiner

U.S. Cl. X.R.

23—209.4; 260—33.6 AQ